United States Patent
Bittinger et al.

(12) United States Patent (10) Patent No.: US 6,453,362 B1
(45) Date of Patent: Sep. 17, 2002

(54) SYSTEMS, METHODS AND COMPUTER PROGRAM PRODUCTS FOR INVOKING SERVER APPLICATIONS USING TICKETS REGISTERED IN CLIENT-SIDE REMOTE OBJECT REGISTRIES

(75) Inventors: F. Dirk Bittinger, Apex; Christopher J. Liebl, Cary, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/132,969

(22) Filed: Aug. 12, 1998

(51) Int. Cl.[7] .................................................. G06F 9/54
(52) U.S. Cl. ...................... 709/316; 709/203; 709/330
(58) Field of Search ................................. 709/200–203, 709/310–320, 328–332; 707/101

(56) References Cited

U.S. PATENT DOCUMENTS 5,802,367 A * 9/1998 Held et al. .................. 709/332
5,860,072 A * 1/1999 Schofield .................... 707/101
6,157,961 A * 12/2000 Kessler et al. .............. 709/315
6,308,225 B1 * 10/2001 Schofield .................... 709/316

OTHER PUBLICATIONS (no author) "The Common Object Request Broker Architecture and Specification," OMG, Revision 2.0, (entire document) Jul. 1995.*
Orfali et al., "Essential Client/Server Survival Guide," Van Nostrand Reinhold, pp. 351–364, 1994.*

* cited by examiner

Primary Examiner—St. John Courtenay, III
(74) Attorney, Agent, or Firm—Myers Bigel Sibley & Sajovec; Edward H. Duffield (57) ABSTRACT

A server application resident on a first computer can be invoked to handle requests from a client application resident on a second computer, remote from the first computer, using a client-side remote object registry. A ticket associated with the client application has a unique identifier registered in the client-side registry. In response to transmitting a command to the first computer to start the server application, the second computer receives from the first computer a stub associated with the server application. The received stub is then stored on the second computer. In response to receiving the stub, the ticket notifies the client application that the server application is ready to receive client application requests.

36 Claims, 4 Drawing Sheets

SYSTEMS, METHODS AND COMPUTER PROGRAM PRODUCTS FOR INVOKING SERVER APPLICATIONS USING TICKETS REGISTERED IN CLIENT-SIDE REMOTE OBJECT REGISTRIES

FIELD OF THE INVENTION

The present invention relates generally to data processing systems, methods and computer program products and, more particularly, to data processing systems, methods and computer program products for distributed object environments.

BACKGROUND OF THE INVENTION

The explosive growth of the Web, the increasing popularity of personal computers (PCs) and advances in high-speed network access have brought distributed computing to the forefront. In addition, there is currently interest in distributed objects for object-oriented applications. Various architectures currently exist for accessing objects located within distributed computing environments. One such architecture is the language-neutral Common Object Request Broker Architecture (CORBA). At the core of the CORBA architecture is an Object Request Broker (ORB) that acts as an object bus over which objects transparently interact with other objects located locally or remotely.

Other language-specific models for distributing applications include Distributed Component Object Model (DCOM) and Remote Method Invocation (RMI). DCOM is an object-oriented implementation for distributing ActiveX® applications (ActiveX® is a trademark of Microsoft, Redmond, Wash.). RMI is an object-oriented implementation for distributing Java® applications (Java® is a trademark of Sun Microsystems, Mountain View, Calif.).

In a distributed object environment, a client application communicates with a remote server application through a "server stub" located on the machine (computer) hosting the client application. The stub is obtained from a remote object registry (i.e., a naming service). Remote object registries are well known to those skilled in this art. Typically, a registry is located on the computer hosting the server application and is referred to as a "server-side" registry. In a distributed object environment, a single server application may typically support multiple client applications. However, a server application must generally be started with an associated stub registered in the server-side registry, before a client application can access the server application.

Figure 1:
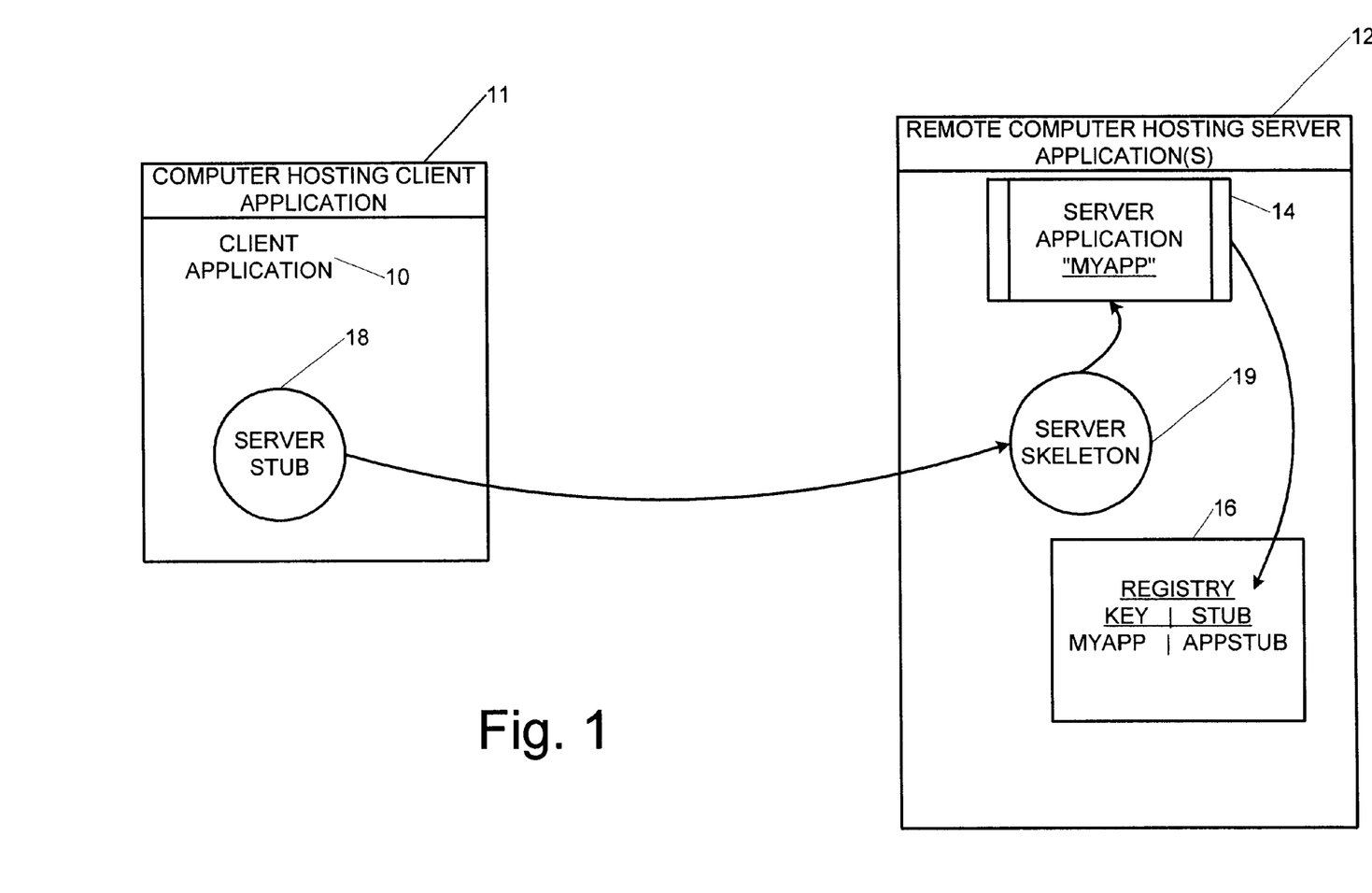
FIG. 1 schematically illustrates a client application communicating with a server application resident on a remote computer.

FIG. 1 schematically illustrates a client application 10, resident within a computer 11, communicating with a server application 14 located on a remote computer 12 hosting one or more server applications. In FIG. 1, the client application 10 wants to communicate with a server application named "MyApp" 14 located on the remote computer 12. Upon initially starting up, the application "MyApp" 14 registered itself with the server-side registry 16 as illustrated. In the illustrated server-side registry 16, the application "MyApp" 14 has identifier (also referred to as a name or key) "MyApp" and the stub "AppStub". To communicate with the "MyApp" application 14, the client application 10 obtains the server stub 18 for the "MyApp" application 14 from the server-side registry 16. As is understood by those skilled in this art, client application requests to a server application are made using a server stub associated with the server application and that is obtained from the computer hosting the server application. A server stub 18 communicates with an associated server application via a server skeleton 19, as is known to those skilled in this art.

Based on the operating platform of a server application, it may be desirable to run the server application in a user's address space. Instead of running a single instance of the server application in a shared address space, each user would run an instance of the server application in a private (user) address space. In some multi-user systems, such as IBM's Multiple Virtual Storage (MVS) systems, running instances of a server application within user address spaces may be required to achieve an acceptable level of protection, security and user authentication.

However, running an instance of a server application in a user address space generally means that user address space creation, server application startup and registration with a server-side registry cannot occur until a user performs "login" procedures with a computer hosting the server application. Unfortunately, after initiating login procedures with the hosting computer, and requesting that a server application be started, there may not be an automatic notification back to the requesting client application that the server application is started and ready to serve client requests. For example, in FIG. 1, if the server application "MyApp" 14 is not already running when the client application 10 makes a request to the server application "MyApp" 14, the client application may not be aware of when the server application "MyApp" 14 is ready to accept requests.

A possible solution to the problem of knowing when a server application is active involves allowing client applications to poll a server-side registry until a valid server stub associated with a server application is returned. Unfortunately, polling is generally not an acceptable solution, particularly in a distributed object environment, because of the complexities polling adds to client applications and because of increases in network traffic.

Other issues of concern with the use of server-side registries relate to reliability, security and object naming. A server-side registry may provide a single point of failure. For example, if a server-side registry terminates abnormally, client applications may be unable to make requests to server applications. Although multiple server-side registries may be utilized to overcome this limitation, multiple server-side registries are generally not desirable because of the administrative complexities involved.

A server-side registry typically provides an application programming interface (API) that allows a client application to query objects registered within the registry. From a security standpoint, a rogue client application could access a server application via a server-side registry API without having permission.

Another drawback of server-side registries is that a client application generally needs to know the name of a registered server stub associated with a particular server application. In an environment of a single computer hosting multiple server applications, wherein each server application registers its own server stub, care must be taken to ensure that server objects are registered with unique names. Each client application accessing a server application needs to be aware of what naming scheme is being used and of any changes to existing naming schemes.

SUMMARY OF THE INVENTION

In view of the above discussion, it is an object of the present invention to allow client applications to know when a server application is ready to receive client application requests without requiring polling.

It is another object of the present invention to reduce processing disruptions between a server application and multiple client applications because of a server-side registry failure.

It is another object of the present invention to enhance security with respect to objects within a distributed object environment.

It is another object of the present invention to reduce naming complexities involved in a distributed object environment including multiple computers hosting server applications.

These and other objects of the present invention are provided by systems, methods and computer program products for invoking a server application resident on a first computer to handle requests from a client application resident on a second computer, remote from the first computer, using a client-side remote object registry. According to the client-side perspective of the present invention, the first computer includes an authentication server and one or more additional server applications resident thereon. The second computer, hosting the client application, has a remote object registry resident thereon. An object, referred to as a ticket and associated with the client application, is created and includes an acknowledgment method associated therewith. A unique identifier for the ticket and a stub associated with the ticket are registered in the client-side registry.

A communications link is established between the client application and authentication server. A command is transmitted from the client application to the authentication server to start the server application. The command is accompanied by an address for the client application and the unique ticket identifier. In response to transmitting the command to the authentication server to start the server application, the second computer receives from the first computer a stub associated with the server application. The received stub is then stored on the second computer in a location accessible to the client application. In response to receiving the stub, the ticket notifies the client application that the server application is ready to receive client application requests.

Operations for creating a ticket associated with the client application may include generating an identifier unique to the ticket, and registering the ticket in a client-side registry. The step of establishing a communications link between the client application and authentication server may include transmitting user identification information from the client application to the authentication server via the established communications link, and validating transmitted user identification information.

According to a server-side perspective of the present invention, the first computer receives, at an authentication server resident thereon, a command from the client application to start the server application, accompanied by an address for the client application and an identifier for a ticket registered with the client-side registry. In response to receiving the client application command to start the server application, the authentication server passes the client application address and ticket identifier to the server application. In response to receiving the client application address and ticket identifier from the authentication server, the server application retrieves from the second computer a stub associated with the ticket registered with the client-side registry. In response to retrieving the stub associated with the ticket registered with the client-side registry, the server application invokes the acknowledgment method associated with the ticket and passes a stub associated with the server application to the second computer.

The present invention is advantageous because, by moving a server-side registry to a computer hosting a client application (i.e., a "client-side" registry), a server application can notify a client application when server application startup processing is complete and can provide a server stub associated with the server application to the client application. As a result, a client application can be automatically notified that a server application is ready to receive client application requests. Consequently, the need for server polling may be eliminated.

Another benefit of the present invention is that failure of a client-side registry may disrupt processing only on the local machine hosting the registry. Other client applications accessing a server application may remain unaffected. In addition, by eliminating a centrally accessible server-side registry, security may be enhanced. Furthermore, object naming issues may be simplified since the only name exposed is the name of a ticket which is controlled by a client application. Servers, according to the present invention, are not dependent on, nor need to know, object naming structures.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

Java

Java® is an object-oriented programming language developed by Sun Microsystems, Mountain View, Calif. Java® is a portable and architecturally neutral language. Java® source code is compiled into a machine-independent format that can be run on any machine with a Java® runtime system known as the Java® Virtual Machine (JVM). The JVM is defined as an imaginary machine that is implemented by emulating a processor through the use of software on a real machine. Accordingly machines running under diverse operating systems, including UNIX, Windows NT, and MacIntosh having a JVM can execute the same Java® program.

Web browsers including Netscape Navigator® and Microsoft Internet Explorer® are referred to as Java®-enabled browsers (client applications) because they include a version of the JVM. Java® applets are programs written in Java® and configured to run within Java®-enabled browsers. Handled in a manner similar to the way images are handled, Java® applets are displayed as part of a HyperText Mark Up Language (HTML) document. When an applet is loaded, it can present special effects, such as animation, graphics, and sound, perform real-time data updates and applications, and can interact with a user through a mouse, keyboard and various interface elements such as buttons, slides and text fields.

As is known to those skilled in this art, Java® source code is compiled into bytecode using a Java® compiler referred to as a Javac. Compiled Java® programs are saved in files with the extension ".class". When a Java®-enabled web browser recognizes that an applet has been requested, a Java® interpreter program runs the applet bytecode on the JVM.

Client/Server Communications

A client application is the requesting program in a client/server relationship. A server application is a program that awaits and fulfills requests from client programs in the same or other computers. A given application in a computer may function as a client with requests for services from other programs and a server of requests from other programs. As is understood by those skilled in the art of client/server communications, if authenticated communications are required, an authentication server may be utilized to create an environment associated with a specific set of user credentials.

As is known to those with skill in this art, client-server environments may include public networks, such as the Internet, and private networks often referred to as "intranets", local area networks (LANs) and wide area networks (WANs).

It is understood that a client application or server application, including computers hosting client and server applications, or other apparatus configured to execute program code embodied within computer usable media, operates as means for performing the various functions and carries out the methods of the various operations of the present invention.

RMI System

In a RMI system, a remote object method invocation may be made via a reference to the remote object. The remote object is exported via a server application, and a handle to the remote object is obtained by a remote client application, either by looking up the object by name in a server-side registry, or by checking return values from another remote method call. When a reference to a remote object is obtained, the object is not sent over the network to the client application requesting the remote object. Instead, a proxy object or stub becomes a client-side proxy for the remote object. Interactions by a client application are performed with this stub. The stub is responsible for handing off data between the client application and the server application.

A skeleton for a remote object is a server-side entity that contains a method which dispatches calls to the actual remote object implementation. A stub (i.e., the proxy for a remote object) is responsible for forwarding method invocations on remote objects to the computer where the. actual remote object implementation resides. A client application's reference to a remote object, therefore, is actually a reference to a local stub.

Figure 2:
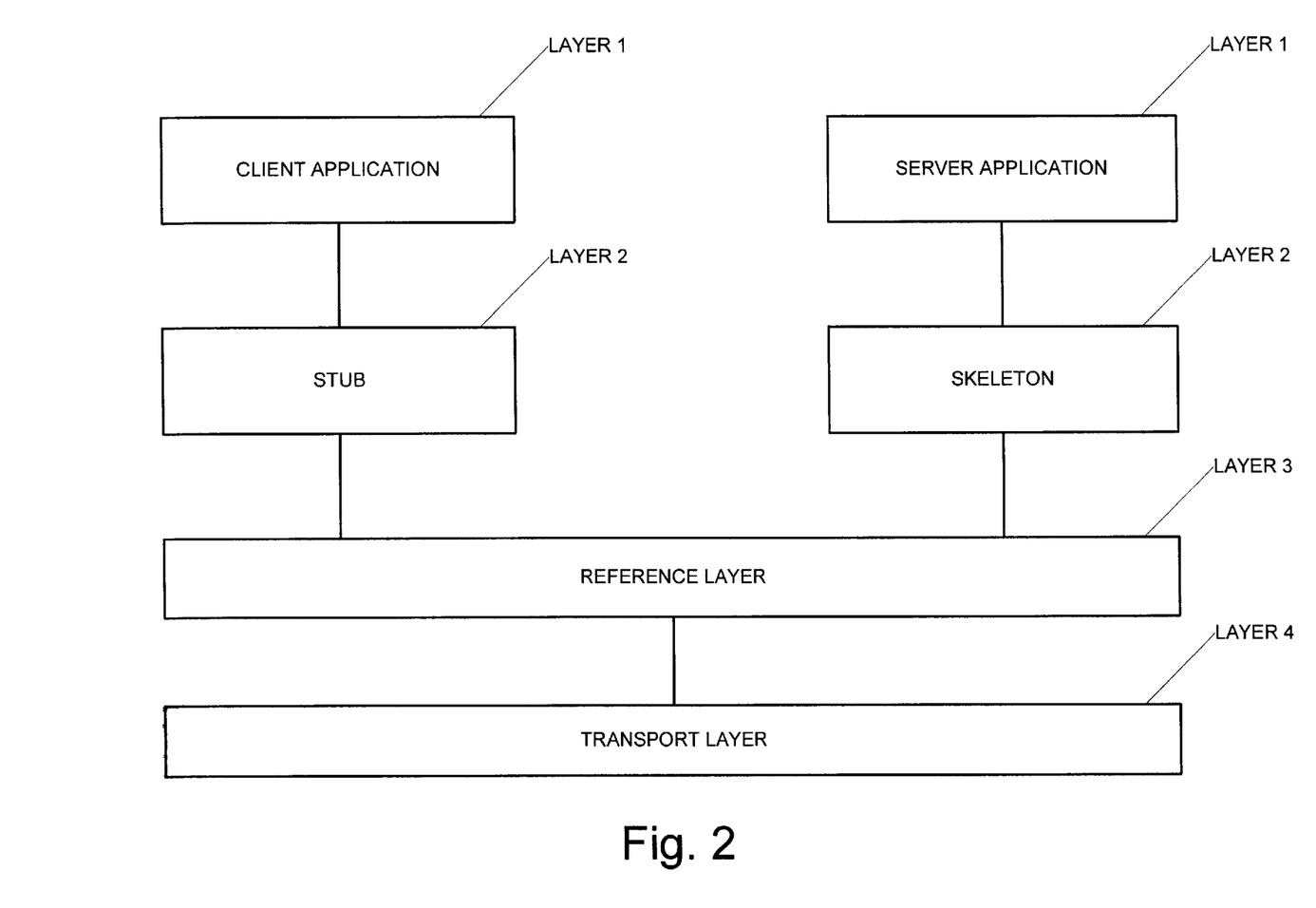
FIG. 2 schematically illustrates a four layer Remote Method Invocation (RMI) system in which the present invention may be utilized.

FIG. 2 schematically illustrates a four layer RMI system in which the present invention may be utilized. Layer 1 is referred to as the application layer and refers to the actual implementation of client and server applications. Requests are made by a client application to access and export remote server objects at the application layer. Layer 2 is referred to as the proxy layer or the stub/skeleton layer. Calls to remote methods and the marshaling of parameters and return objects are performed via the proxy layer.

Layer 3 is referred to as the remote reference layer and is responsible for handling replicated objects and for performing implementation-specific tasks with remote objects. Layer 4 is referred to as the transport layer and is responsible for setting up connections between client applications and server applications and handling data transmissions between client applications and server applications. For example, Transmission Control Protocol/Internet Protocol (TCP-IP), the basic communication protocol of the Internet, resides within the transport layer.

To invoke a remote server application within a RMI system, a client application makes a call to the client stub (after receiving the stub from the server-side registry). The stub packs the call parameters into a request message, and invokes a transport protocol (e.g., TCP/IP) to ship the message to the server. At the server side, the transport protocol delivers the message to the skeleton, which then unpacks the request message and invokes the appropriate server application (e.g., calls an actual function on an object). The RMI system, as well as other distributed object systems within which the present invention may be utilized, are well known to those skilled in this art and need not be discussed further.

Remote Object Registry

In distributed object environments, remote objects are often registered in a name service or registry located in a known location on a computer hosting server applications. A registry is conventionally a type of server application that enables another server application to look up objects that are being exported for remote method invocation. A registry keeps track of the addresses of remote objects that are being exported by their applications. Typically, each object is assigned a unique name to facilitate identification. Registries are well known to those skilled in this art and need not be described further.

Client-Side Registry

Figure 3:
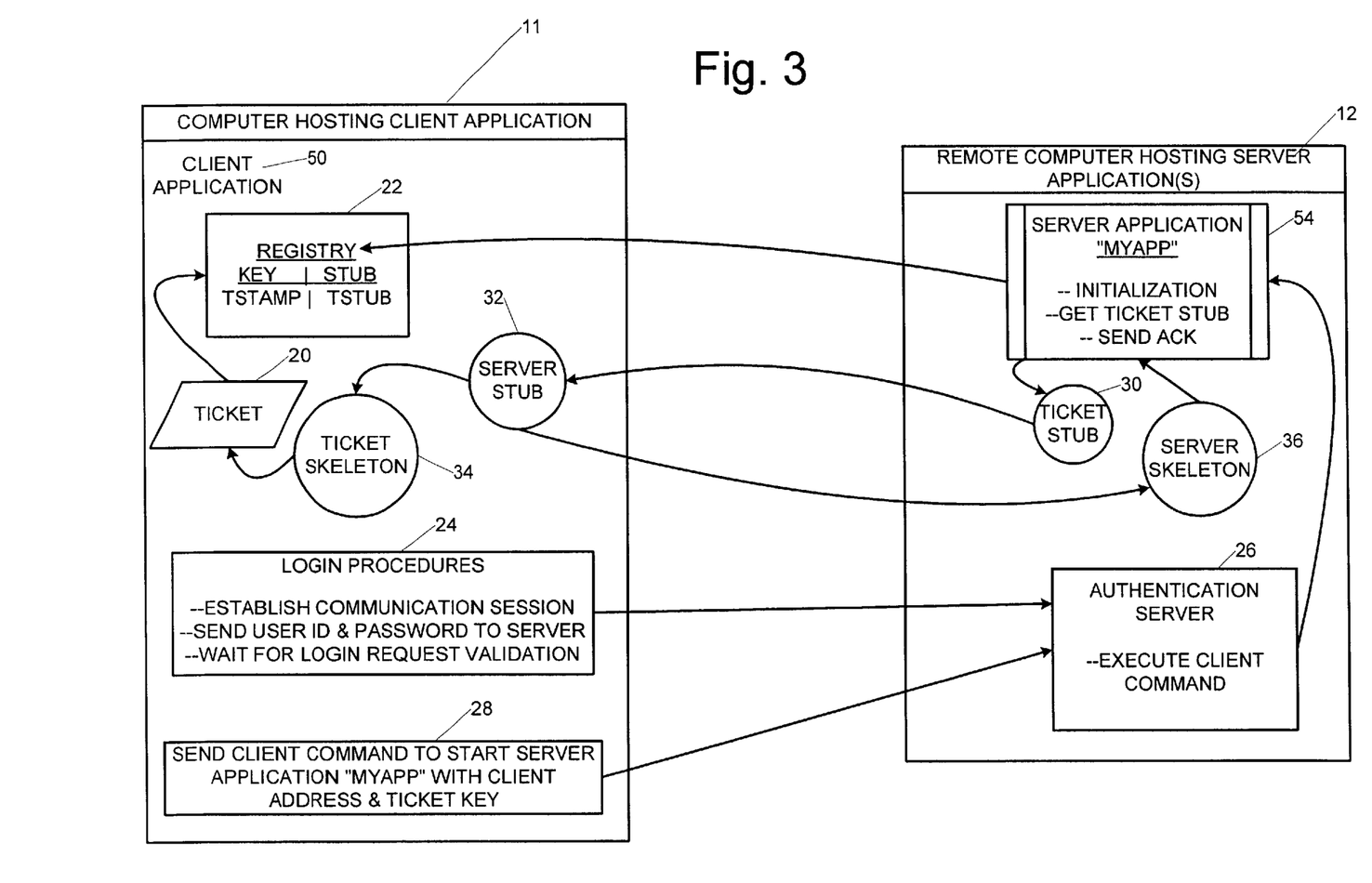
FIG. 3 schematically illustrates a client-side registry according to the present invention and a client application communicating with a server application resident on a remote computer, according to the present invention.

Referring now to FIG. 3, a client-side registry, according to the present invention, and a client application communicating with an application located on a remote server, according to the present invention, are schematically illustrated. In FIG. 3, the client application 50 wants to communicate with the application named "MyApp" 54 located on the remote computer 12. The client application 50 creates an object referred to as a "ticket" 20 and registers the ticket with a unique identifier or key in a client-side registry 22 located within the computer 12 hosting the client application 50.

In the illustrated client-side registry 22, the ticket 20, according to the present invention, represents a notification and identification mechanism having "tstamp" as an identifier and "tstub" as a stub name. Preferably, the identifier is unique to the ticket 20. Preferably, registering the ticket 20 with the client-side registry 22 stores a reference within the client-side registry database to the ticket. As is understood by those skilled in this art, the identifier "tstamp" may be used to locate the ticket 20 within the database.

After creating the ticket 20, the client application 50 proceeds with login procedures 24 for establishing a communications link with an authentication server 26 located on the remote computer 12. An exemplary communications link may be a socket established using TCP/IP between the client application 50 and the authentication server 26. An exemplary and well known authentication server is an "rlogin" server. In the illustrated embodiment, TCP/IP is used to open a socket with the authentication server 26. The client application 50 then sends a user id and password to the authentication server 26 and waits for the login request to be validated. Login procedures between a client application and authentication servers are well understood in this art and need not be discussed further. However, it is understood that the present invention is not limited to the illustrated login procedures. Various login procedures between a client and a server may be utilized with the present invention.

After the login request is validated, the client application 50 issues a command 28 to the authentication server 26 to start an application resident on the hosting computer 12, or on another computer accessible to the computer 12. The client application 50 then waits for an acknowledgment. Using parameters, such as client application address, which was received from the client application 50 during login procedures, and the identifier for the ticket 20, the authentication server 26 executes the client application command to start the application "MyApp" 54. The application "MyApp" 54 starts up (i.e., begins execution of its programmed instruction sequence) and performs various initialization tasks, as would be understood by those skilled in this art.

Using the client address and ticket identifier "tstamp", the application "MyApp" 54 retrieves the ticket stub "tstub" 30 from the client-side registry 22. Using the ticket stub "tstub" 30, the application "MyApp" 54 invokes an acknowledgment method of the ticket stub and passes the server stub 32 as a parameter to the client application 50. The application "MyApp" 54 then waits for requests from the client application 50.

Upon receiving the acknowledgment from the application "MyApp" 54, the ticket 20 saves the server stub 32 so that the server stub 32 is accessible to the client application 10. The ticket 20 notifies the client application 50 that the login request is complete and that the application "MyApp" 54 is ready to receive requests. The client application 50 can then use the server stub 30 to make requests to the application "MyApp" 54.

Figure 4:
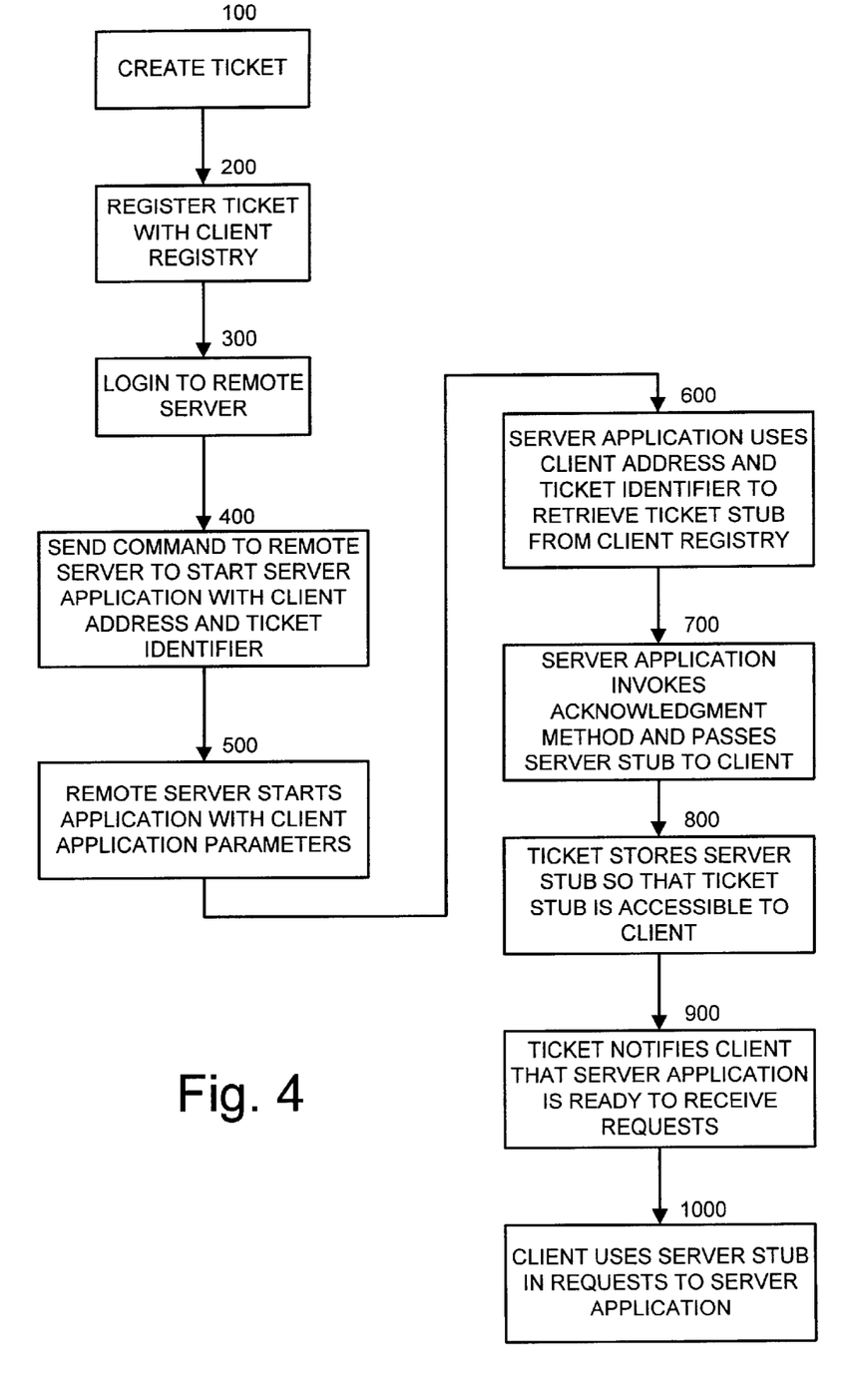
FIG. 4 schematically illustrates operations for sending client application requests to remote server applications, according to aspects of the present invention.

Referring now to FIG. 4, operations for utilizing a client-side registry for sending client application requests to invoke remote server applications, according to aspects of the present invention, are schematically illustrated. A user starts a client application resident within a computer and begins to transmit a client request to a remote server application. The client application creates a ticket (Block 100). The client application then registers the created ticket with a unique identifier within a registry resident on the computer hosting the client application (Block 200). Once the ticket is registered in the client-side registry, the client application begins login procedures with an authentication server associated with the desired server application resident on a remote computer (Block 300). Login procedures, as described above, may include establishing a communications link with an authentication server, transmitting a user id and password to the authentication server, and waiting for the login request to be validated.

Once login information is received from a client application, the authentication server forwards the request to the server application, along with the client address and ticket identifier (Block 400). The server application is then started using the provided client application parameters (Block 500).

The server application uses the provided client application parameters and the ticket identifier to retrieve a ticket stub from the client-side registry (Block 600). Using the retrieved ticket stub, the server application invokes an acknowledgment method of the retrieved ticket stub and passes a server stub to the client application (Block 700). The server application then waits for incoming client requests from the client application.

Upon receipt of the acknowledgment and server stub from the server application, the ticket stores the server stub in a location area accessible to the client application (Block 800). The ticket notifies the client application that the login request is complete and that the server application is ready to receive client requests (Block 900). The client application then uses the server stub to make requests to the server application (Block 1000).

It will be understood that each block of the flowchart illustrations of FIG. 4 and combinations of blocks in the flowchart illustrations of FIG. 4, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the dis- That which is claimed is:

1. A method of invoking a server application resident on a first computer to handle requests from a client application resident on a second computer remote from the first computer, the second computer having a remote object registry resident thereon, the method comprising the steps of:

creating a ticket associated with the client application, the ticket having an acknowledgment method associated therewith;

registering in the remote object registry the ticket with a unique identifier;

establishing a communications link between the client application and the server application; and transmitting to the server application an address for the client application and the ticket identifier.

2. A method according to claim 1 wherein the first computer includes an authentication server and wherein the step of establishing a communications link between the client application and server application comprises:

establishing a communications link between the client application and the authentication server;

transmitting user identification information from the client application to the authentication server via the established communications link; and validating transmitted user identification information.

3. A method according to claim 1 further comprising the step of receiving from the first computer a stub associated with the server application in response to transmitting a command to start the server application.

4. A method according to claim 3 further comprising the step of storing the stub associated with the server application on the second computer in a location accessible to the client application.

5. A method according to claim 3 wherein, responsive to receiving from the first computer a stub associated with the server application, the ticket notifies the client application that the server application is ready to receive client application requests.

6. A method of invoking a server application resident on a first computer to handle requests from a client application resident on a second computer remote from the first computer, the second computer having a remote object registry resident thereon, the method comprising the steps of:

receiving at the first computer a command from the client application to start the server application, wherein the command is accompanied by an address for the client application and an identifier for a ticket registered with the remote object registry;

responsive to receiving the client application command to start the server application, passing the client application address and ticket identifier to the server application;

responsive to receiving the client application address and ticket identifier, retrieving from the second computer a stub associated with the ticket registered with the remote object registry; and responsive to retrieving the stub associated with the ticket registered with the remote object registry, invoking the acknowledgment method associated with the ticket and passing a stub associated with the server application to the second computer.

7. A method according to claim 6 wherein the first computer includes an authentication server and wherein a command from the client application to start the server application is received by the authentication server.

8. A method of invoking a server application resident on a first computer to handle requests from a client application resident on a second computer remote from the first computer, the second computer having a remote object registry resident thereon, the method comprising the steps of:

creating a ticket associated with the client application, the ticket having an acknowledgment method associated therewith;

registering in the remote object registry the ticket with a unique identifier;

establishing a communications link between the client application and the server application;

transmitting to the server application an address for the client application and the ticket identifier;

receiving from the client application an address for the client application and an identifier for a ticket registered with the remote object registry;

responsive to receiving the client application address and ticket identifier, retrieving from the second computer a stub associated with the ticket registered with the remote object registry; and responsive to retrieving the stub associated with the ticket registered with the remote object registry, invoking the acknowledgment method associated with the ticket and passing a stub associated with the server application to the second computer.

9. A method according to claim 8 wherein the first computer includes an authentication server and wherein the step of establishing a communications link between the client application and server application comprises:

establishing a communications link between the client application and the authentication server;

transmitting user identification information from the client application to the authentication server via the established communications link; and validating transmitted user identification information.

10. A method according to claim 8 further comprising the step of receiving from the first computer a stub associated with the server application in response to transmitting a command to start the server application.

11. A method according to claim 10 further comprising the step of storing the stub associated with the server application on the second computer in a location accessible to the client application.

12. A method according to claim 10 wherein, responsive to receiving from the first computer a stub associated with the server application, the ticket notifies the client application that the server application is ready to receive client application requests.

13. A system for invoking a server application resident on a first computer to handle requests from a client application resident on a second computer remote from the first computer, the second computer having a remote object registry resident thereon, comprising:

means for creating a ticket associated with the client application, the ticket having an acknowledgment method associated therewith;

means for registering in the remote object registry the ticket with a unique identifier;

means for establishing a communications link between the client application and the server application; and means for transmitting to the server application an address for the client application and the ticket identifier.

14. A system according to claim 13 wherein the first computer includes an authentication server and wherein the means for establishing a communications link between the client application and the server application comprises:

means for establishing a communications link between the client application and the authentication server;

means for transmitting user identification information from the client application to the authentication server via the established communications link; and means for validating transmitted user identification information.

15. A system according to claim 13 further comprising means for receiving from the first computer a stub associated with the server application responsive to said means for transmitting a command to start the server application.

16. A system according to claim 15 further comprising means for storing the stub associated with the server application on the second computer in a location accessible to the client application.

17. A system according to claim 15 wherein, the ticket comprises means for notifying the client application that the server application is ready to receive client application requests, responsive to the means for receiving from the first computer a stub associated with the server application.

18. A system for invoking a server application resident on a first computer to handle requests from a client application resident on a second computer remote from the first computer, the second computer having a remote object registry resident thereon, the method comprising the steps of:

means for receiving a command from the client application to start the server application, wherein the command is accompanied by an address for the client application and an identifier for a ticket registered with the remote object registry;

means, responsive to receiving the client application command to start the server application, for passing the client application address and ticket identifier to the server application;

means, responsive to receiving the client application address and ticket identifier, for retrieving from the second computer a stub associated with the ticket registered with the remote object registry; and means, responsive to retrieving the stub associated with the ticket registered with the remote object registry, for invoking the acknowledgment method associated with the ticket and passing a stub associated with the server application to the second computer.

19. A system according to claim 18 wherein the first computer includes an authentication server and wherein the command from the client application to start the server application is received by the authentication server.

20. A system for invoking a server application resident on a first computer to handle requests from a client application resident on a second computer remote from the first computer, the second computer having a remote object registry resident thereon, the method comprising the steps of:

means for creating a ticket associated with the client application, the ticket having an acknowledgment method associated therewith;

means for registering in the remote object registry the ticket with a unique identifier;

means for establishing a communications link between the client application and the server application;

means for transmitting to the server application an address for the client application and the ticket identifier;

means for receiving from the client application an address for the client application and an identifier for a ticket registered with the remote object registry;

means, responsive to receiving the client application address and ticket identifier, for retrieving from the second computer a stub associated with the ticket registered with the remote object registry; and means, responsive to retrieving the stub associated with the ticket registered with the remote object registry, for invoking the acknowledgment method associated with the ticket and passing a stub associated with the server application to the second computer.

21. A system according to claim 20 wherein the first computer includes an authentication server and wherein the means for establishing a communications link between the client application and the server application comprises:

means for establishing a communications link between the client application and the authentication server;

means for transmitting user identification information from the client application to the authentication server via the established communications link; and means for validating transmitted user identification information.

22. A system according to claim 20 further comprising means for receiving from the first computer a stub associated with the server application responsive to the means for transmitting a command start the server application.

23. A system according to claim 22 further comprising means for storing the stub associated with the server application on the second computer in a location accessible to the client application.

24. A system according to claim 22 wherein, the ticket comprises means for notifying the client application that the server application is ready to receive client application requests, said notifying means responsive to receiving from the first computer a stub associated with the server application.

25. A computer program product for invoking a server application resident on a first computer to handle requests from a client application resident on a second computer remote from the first computer, the second computer having a remote object registry resident thereon, the computer program product comprising a computer usable storage medium having computer readable program code means embodied in the medium, the computer readable program code means comprising:

computer readable program code means for creating a ticket associated with the client application, the ticket having an acknowledgment method associated therewith;

computer readable program code means for registering in the remote object registry the ticket with a unique identifier;

computer readable program code means for establishing a communications link between the client application and the server application; and computer readable program code means for transmitting to the server application an address for the client application and the ticket identifier.

26. A computer program product according to claim 25 wherein the first computer includes an authentication server and wherein the computer readable program code means for establishing a communications link between the client application and the server application comprises:

computer readable program code means for establishing a communications link between the client application and the authentication server;

computer readable program code means for transmitting user identification information from the client application to the authentication server via the established communications link; and computer readable program code means for validating transmitted user identification information.

27. A computer program product according to claim 25 further comprising computer readable program code means for receiving from the first computer a stub associated with the server application responsive to said computer readable program code means for transmitting a command to start the server application.

28. A computer program product according to claim 27 further comprising computer readable program code means for storing the stub associated with the server application on the second computer in a location accessible to the client application.

29. A computer program product according to claim 27 wherein, the ticket comprises computer readable program code means for notifying the client application that the server application is ready to receive client application requests, responsive to the computer readable program code means for receiving from the first computer a stub associated with the server application.

30. A computer program product for invoking a server application resident on a first computer to handle requests from a client application resident on a second computer remote from the first computer, the second computer having a remote object registry resident thereon, the computer program product comprising a computer usable storage medium having computer readable program code means embodied in the medium, the computer readable program code means comprising:

computer readable program code means for receiving a command from the client application to start the server application, wherein the command is accompanied by an address for the client application and an identifier for a ticket registered with the remote object registry;

computer readable program code means, responsive to receiving the client application command to start the server application, for passing the client application address and ticket identifier to the server application;

computer readable program code means, responsive to receiving the client application address and ticket identifier, for retrieving from the second computer a stub associated with the ticket registered with the remote object registry; and computer readable program code means, responsive to retrieving the stub associated with the ticket registered with the remote object registry, for invoking the acknowledgment method associated with the ticket and passing a stub associated with the server application to the second computer.

31. A computer program product according to claim 30 wherein the first computer includes an authentication server and wherein the command from the client application to start the server application is received by the authentication server.

32. A computer program product for invoking a server application resident on a first computer to handle requests from a client application resident on a second computer remote from the first computer, the second computer having a remote object registry resident thereon, the computer program product comprising a computer usable storage medium having computer readable program code means embodied in the medium, the computer readable program code means comprising:

computer readable program code means for creating a ticket associated with the client application, the ticket having an acknowledgment method associated therewith;

computer readable program code means for registering in the remote object registry the ticket with a unique identifier;

computer readable program code means for establishing a communications link between the client application and the server application;

computer readable program code means for transmitting to the server application an address for the client application and the ticket identifier;

computer readable program code means for receiving from the client application an address for the client application and an identifier for a ticket registered with the remote object registry;

computer readable program code means, responsive to receiving the client application address and ticket identifier, for retrieving from the second computer a stub associated with the ticket registered with the remote object registry; and computer readable program code means, responsive to retrieving the stub associated with the ticket registered with the remote object registry, for invoking the acknowledgment method associated with the ticket and passing a stub associated with the server application to the second computer.

33. A computer program product according to claim 32 wherein the first computer includes an authentication server and wherein the computer readable program code means for establishing a communications link between the client application and the server application comprises:

computer readable program code means for establishing a communications link between the client application and the authentication server;

computer readable program code means for transmitting user identification information from the client application to the authentication server via the established communications link; and computer readable program code means for validating transmitted user identification information.

34. A computer program product according to claim 32 further comprising computer readable program code means for receiving from the first computer a stub associated with the server application responsive to the computer readable program code means for transmitting a command to start the server application.

35. A computer program product according to claim 34 further comprising computer readable program code means for storing the stub associated with the server application on the second computer in a location accessible to the client application.

36. A computer program product according to claim 34 wherein, the ticket comprises computer readable program code means for notifying the client application that the server application is ready to receive client application requests responsive to receiving from the first computer a stub associated with the server application.

* * * * *